United States Patent [19]

Halabi et al.

[11] Patent Number: 5,217,940

[45] Date of Patent: * Jun. 8, 1993

[54] PROCESS FOR MAKING HIGH-STRENGTH ALUMINA SUBSTRATES AND CATALYSTS AND PRODUCTS MADE THEREFROM

[76] Inventors: Ma'mum A. Halabi; Anthony Stanislaus; Huda Al-Zaid, all of P.O. Box 24885, Safat, Kuwait, 13109

[*] Notice: The portion of the term of this patent subsequent to Jun. 8, 2008 has been disclaimed.

[21] Appl. No.: 409,392

[22] Filed: Sep. 19, 1989

[51] Int. Cl.$^5$ .......................... B01J 21/04; B01J 32/00
[52] U.S. Cl. .................................. 502/355; 502/439; 423/628
[58] Field of Search ................ 502/355, 439; 423/626, 423/628

[56] References Cited

U.S. PATENT DOCUMENTS

| | | | |
|---|---|---|---|
| 4,508,849 | 4/1985 | Inoue et al. | 502/439 X |
| 4,547,485 | 10/1985 | Bowes | 502/314 |
| 4,559,321 | 12/1985 | Slaugh | 502/263 |
| 4,579,727 | 4/1986 | Cronkright et al. | 423/573 R |
| 4,579,728 | 4/1986 | Schoenthal et al. | 423/626 |
| 4,579,729 | 4/1986 | Schoenthal et al. | 423/626 |
| 4,613,585 | 9/1986 | Takumi et al. | 502/355 |
| 4,615,999 | 10/1986 | Takumi et al. | 502/314 |
| 4,624,938 | 11/1986 | Kemp | 502/208 |

OTHER PUBLICATIONS

T. Ono, Y. Ohguchi and O. Togari, "Control of the Pore Structure of Porous Alumina," *Preparation of Catalysts III,* (1983) p. 631.

W. Stoepler and K. K. Unger, "The Properties of Commercial Alumina Base Materials . . . ", *Preparation of Catalysts III* (1983), p. 643.

D. L. Trimm and A. Stanislaus, "The Control of Pore Size in Alumina Catalyst Supports: A Review," *Applied Catalysis,* 21 (1986) pp. 215-238.

J. W. Fulton, "Making the Catalyst," *Chemical Engineering* (Jul. 7, 1986), p. 59.

J. Uchytil, M. Kraus and P. Schneider, "Influence of Pelleting Conditions on Catalyst Pore Structure and Effective," *Applied Catalysis,* 28 (1986), p. 133.

*Primary Examiner*—W. J. Shine

[57] ABSTRACT

High-strength alumina substrates and catalysts with predetermined pore structures having a sulfonated polyamine product incorporated therein, raw batch mixes and a process for making the same are disclosed.

20 Claims, 4 Drawing Sheets

PROCESS FOR MAKING HIGH-STRENGTH ALUMINA SUBSTRATES AND CATALYSTS AND PRODUCTS MADE THEREFROM

FIELD OF THE INVENTION

This invention relates to processes and compositions for making high strength alumina substrates and catalysts with predetermined pore structures and products made thereby and/or therefrom; and processes, compounds and products having a sulfonated polymeric product incorporated therein.

BACKGROUND OF THE INVENTION

Alumina is a widely used material in various fields mainly due to the ability of preparing it with a wide variety of morphological properties. Specifically, it can be prepared with surface areas of up to several hundred square meters per gram and pore size distributions with diameters ranging from a few nanometers to several hundred nanometers. One application of particular importance is the use of alumina as a base material in making heterogenous catalysts, particularly for petroleum refining. In this application, alumina powders are shaped into various forms such as spheres, pellets or extrudates. The properties that are considered to be important for this application are the surface area (SA), the mechanical strength (MS) and the pore size distribution (PSD) of the formed alumina. In general, the three properties are interrelated in that alumina with large pores normally has low surface area and poor mechanical strength.

During recent years, it has become increasingly important to design and manufacture alumina catalyst support materials and catalysts having wide pores while maintaining reasonably high mechanical strength. The alumina materials are particularly important for processing petroleum heavy residues, coal liquids, or other feedstocks. Such feedstocks contain large asphaltenic molecules that are chemically resistant to cracking and hydrotreatment, and high percentages of foulant metals mostly associated with the asphaltenic molecules that deposit on the surface of the catalyst support. Thus if the catalyst has small pores, the tendency of the foulant metals is to deposit on the outer surface of the pellet due to the small size of the pore mouth. The continuous deposition of the foulant metals on the pellet surface eventually blocks the entry to the inner pores and leads to the deactivation of the catalyst. Hence, intensive efforts have been made during the past two decades to make alumina extrudates with larger pore diameters to overcome this problem.

Accordingly, there is a need for a sufficiently flexible process that can be used to make extrudates having a narrow distribution of pore sizes, with the desired average pore diameter, and at the same time maintaining sufficient strength to withstand the vigors of petroleum processing. It is also desirable to provide a process for making catalysts supports with a narrow distribution of large diameter pores and relatively high strengths for hydrotreating heavy petroleum residues.

In the past, there have been numerous approaches for producing alumina catalysts and supports with controlled pore sizes. For example, D. L. Trimm and A. Stanislaus in "The Control of Pore Size in Alumina Catalyst Supports: A Review," *Applied Catalysis*, 21 (1986) 215-238 discusses the state of the art at that time. As pointed out therein, it is often necessary to control both large and small pores and there are a number of approaches for doing so. For example, large pores generally originate from inter-particle spaces and their size may be controlled by mixing alumina powder with graphite, pelleting and then removing the graphite. Small pores originate from spaces within the particle caused for example by removal of water between the crystal planes.

The Trimm and Stanislaus article also points out that the control of pore size in alumina, i.e., the larger pore sizes can be accomplished by control of particle agglomeration, size and shape of the agglomerates and that polymer additives may increase macroporosity as a result of space filling.

Several methods have been utilized in the literature to vary the pore structure of extrudates. Such methods include varying the microcrystal structure and agglomerate size of the alumina, the type of alumina salt used, the precipitating agent, the operating condition during precipitation such as temperature, pH and aging of the solution and the method and conditions of drying. Other factors affecting pore structure include pelleting or extruding conditions, such as pressure and temperature, particularly with respect to macropores, i.e., pores with diameters greater than 50 nm (500 Angestrom Units) and the effect of pore forming additives such as polymers and carbon powders used to generate macropores. Such additives have been added to an alumina during kneading and then when the extrudates or pellets are calcined, the organic material decomposes or burns forming water and then volatile oxides, thus leaving voids in place of the decomposed substances.

It has now been found that substrates and catalysts may be produced by the processes described herein with pore structure tailored to a specific application, and that such substrates can be produced with narrow monomodal pore-size distribution having different average pore diameters ranging from small diameters of around 50 angstrom to as much as 1000 angstrom units. Substrates with narrow bimodal pore size distribution with one set of small pores having relatively small average diameters and large pores having large average diameters can also be produced.

It has also been found that substrates having wide pores produced by the presently disclosed process have relatively high strength as compared to the wide pore substrates reported in the prior art literature.

BRIEF SUMMARY OF THE INVENTION

In essence, the present invention contemplates methods and compositions for making alumina substrates and catalysts and products made thereby and therefrom.

The method for making an alumina substrate having predetermined pore structures and relatively high strength comprises the steps of providing a mixture of alumina powder, water and a peptizing agent and forming a paste like mass from the mixture. This paste like mass is then kneaded to obtain a wet free flowing paste, and a sulfonated resin solution is added to the wet free flowing paste with continued kneading. And after the foregoing step, the free flowing paste is formed into a shaped body, dried, calcined, and thermally treated with a reagent in an autoclave.

The method for forming a catalyst according to the present invention includes each of the above steps and in addition impregnating the shaped body or extrudates with suitable metallic salts.

The invention also contemplates the novel catalysts and supports therefore made from the foregoing processes and the novel compositions which are disclosed herein.

DETAILED DESCRIPTION OF THE PREFERRED EMBODIMENTS

The process for preparing alumina extrudates, tablets, or pellets and catalysts using a novel alumina paste composition disclosed herein contemplates the use of special additives to obtain high plasticity and high workability. As a result, the extrudates can have a wide range of pore structure and pore size distribution and can be used in a wide variety of applications, particularly, as catalysts for various refining processes. More specifically, the extrudates can be prepared with a narrow monomodal or bimodal pore structure with large average pore diameter while maintaining high mechanical strength.

In preparing such extrudates, an alumina paste is formed by kneading commercially available alumina powders in either hydrated or calcined forms with a solution of an inorganic or organic acid such as nitric acid or acetic acid. Nitric acid is preferred. The concentration of the acid solution ranges between 0.5 to 10%, and preferably 1-3% by weight, and the amount of acid solution added to 1000 parts of alumina range between 100-1000 parts. The kneading is continued and additional water in the range of 0-900 parts are added to 1000 parts of alumina to obtain a wet but free flowing paste. To this paste, a solution of sulfonated resins in water such as sulfonated melamine formaldehyde, sulfonated urea melamine formaldehyde, sulfonated naphthalene formaldehyde, or lignosulfonate resins is added in the range of 10-150 parts of resin for 1000 parts of alumina powder. The concentration of resin solution is in the range of 2-30% by weight. This addition of the resin solution is carried out with continuous kneading over a period of 15-30 minutes. Along with the resin solution other additives such as carbon black, binders, etc., can be added and the kneading continued for an additional 10-20 minutes.

The paste prepared according to the above is extruded through nozzles having desired diameters, dried at 110° C. for 10–48 hours, preferably 20-30 hours. The dried extrudates are then calcined under programmed temperature conditions up to a maximum temperature of 500°-600° C. for a total duration of 3-10 hours, preferably 4-6 hours.

The alumina extrudates prepared in accordance with the above were thermally treated in an autoclave at temperatures ranging between 100°-400° C., with various reagents including water, bases, preferably ammonium hydroxides, or acids, preferably a low molecular weight organic acid such as acetic acid. The duration of the treatment varies between 30 minutes and 24 hours and preferably from 1-8 hours.

Hydroprocessing catalysts are prepared using alumina extrudates with wide average pore diameter made in accordance with the above procedure by impregnating the extrudates with suitable metallic salts. Thus, to 100 parts of alumina extrudates, 5-20 parts, preferably 8-15 parts, of molybdenum or tungsten and 1-5 parts, preferably 2-4 parts, of nickel or cobalt are added in the form of water soluble salts. The resulting product is dried at 80°-150° C., preferably at 110°-130° C. for 20-30 hours. The extrudates are then calcined at 450°-600° C. for 4-8 hours.

The methods and compositions or raw batch mixes for making alumina substrates having a predetermined pore structure and relatively high strength, and hydroprocessing catalysts and products made thereby and therefrom will be further described below by the following examples which are intended for illustration and are not to be construed as limiting the invention.

EXAMPLE 1

Alumina extrudates were prepared from boehmite (alpha-alumina monohydrate) gel powder. The boehmite powder was mixed with the peptizing solution and kneaded to prepare a heavy paste suitable for extrusion. In a typical experiment, 250 g of boehmite powder was mixed with 200 ml of 1.5% nitric acid, which was added at a constant flow rate over 20 minutes with continuous kneading.

Figure 1:
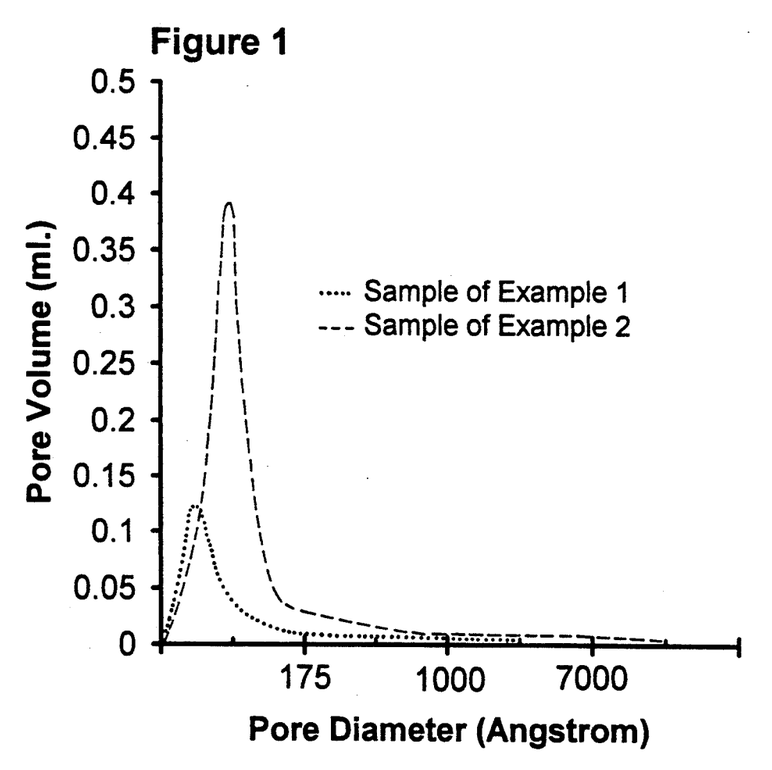
FIG. 1 illustrates the pore size distribution of alumina extrudate samples of examples 1 and 2.

A Linden Model D-5277 (West Germany) kneading machine was used for mixing the paste. Kneading was continued for 10 minutes after completely adding the peptizing agent. Total kneading time was 30 minutes. The paste was then extruded through 1.5 mm nozzles using a NETZCH (West Germany) screw-type extrusion machine. The extrudates were dried at 110° C. in an oven for 24 hours. The dried extrudates were then calcined under programmed temperature conditions (at 370° C. for 2 hours, 450° C. for 1 hour and 550° C. for 2 hours). Characteristics of the extrudates are presented in Table 1 and the pore size distributions are shown in FIG. 1.

EXAMPLE 2

Alumina extrudates were prepared in accordance with the procedure described in Example 1, except that 5 parts of a commercial sulfonated melamine formaldehyde resin were added to the paste exactly after 20 minutes from the start of the mixing, when the acid addition was completed. Kneading was continued for another 10 minutes after adding the resin and the paste was extruded. The characteristics of the extrudates prepared by the procedure are summarized in Table 1 and pore size distribution in FIG. 1.

EXAMPLE 3

Figure 2:
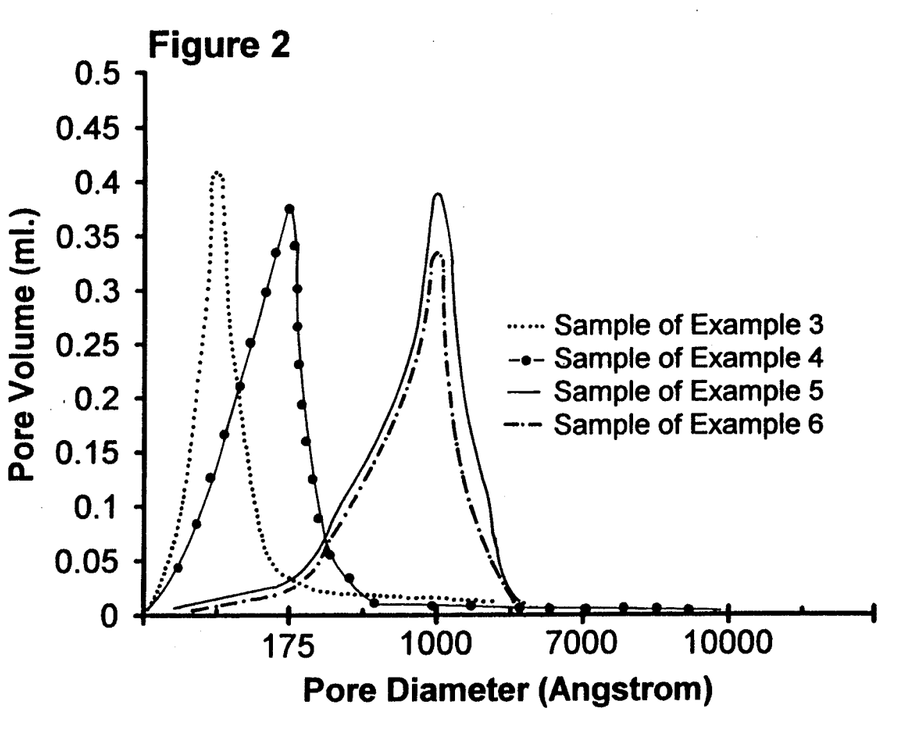
FIG. 2 illustrates the pore size distribution of alumina samples prepared in accordance with examples 3, 4, 5 and 6.

Alumina extrudates, prepared in accordance with Example 2, were heated at 150° C. in an autoclave in presence of water for 1 hour such that the weight ratio of alumina to water is 1:1. Following the heating, the extrudates were calcined at 550° C. Surface area and mechanical strength of the resulting product are shown in Table 2. The pore size distribution of the resulting extrudates is shown in FIG. 2.

EXAMPLE 4

Alumina extrudates prepared in accordance with Example 2, were treated as in Example 3 except that the thermal treatment was increased to 8 hours. The properties of the resulting extrudates are listed in Table 2 and the pore size distribution is shown in FIG. 2.

EXAMPLE 5

Alumina extrudates, prepared in accordance with Example 2, were treated at 300° C. in an autoclave in presence of water such that the ratio of alumina to water is 1:1 for 1 hour. The extrudates were then calcined at 550° C. The properties of the extrudates are listed in Table 2 and the pore size distribution is shown in FIG. 2.

EXAMPLE 6

Alumina extrudates prepared in accordance with Example 2, were treated as in Example 5 except that the thermal treatment was extended to 8 hours. The properties of resulting extrudates are listed in Table 2 and the pore size distribution is shown in FIG. 2.

EXAMPLE 7

Figure 3:
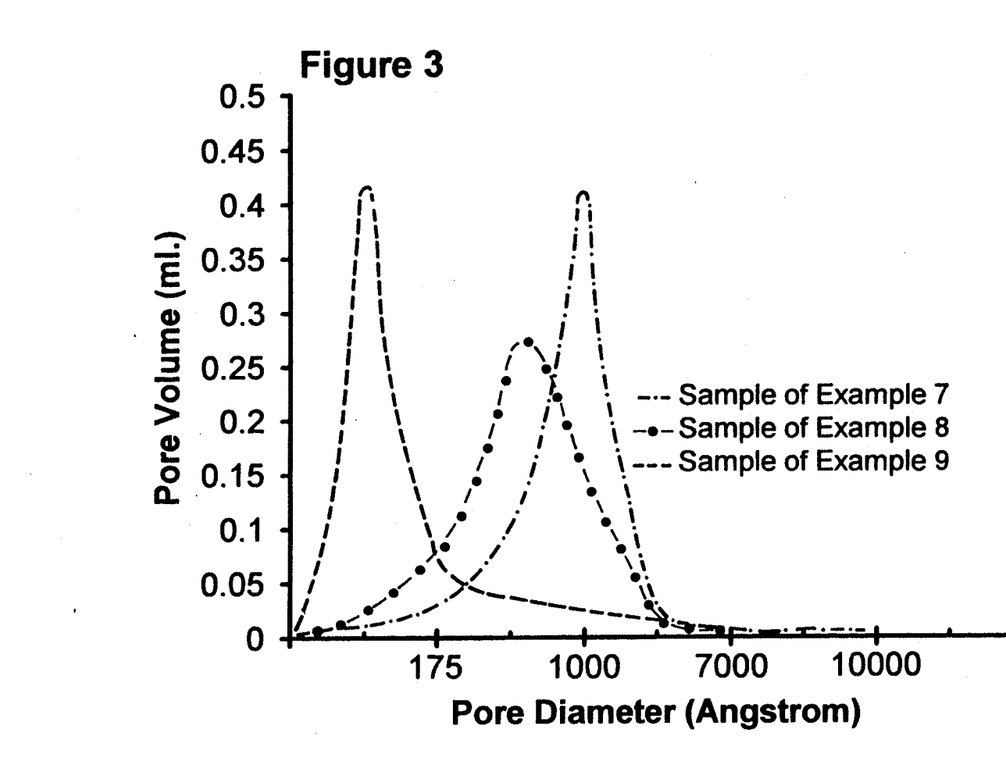
FIG. 3 illustrates the pore size distribution of alumina samples of examples 7, 8 and 9.

Alumina extrudates, prepared in accordance with Example 2, were treated with aqueous ammonia such that the weight ratio of aqueous ammonia to alumina is 1:1 for 1 hour at 300° C. The extrudates were then calcined at 550° C. The properties of the resulting product are listed in Table 2 and the pore size distribution is shown in FIG. 3.

EXAMPLE 8

Alumina extrudates, prepared in accordance with Example 2, were treated with aqueous ammonia as in Example 7 except that the temperature was 200° C. and the duration is 4 hours. The properties of the extrudates are listed in Table 2 and the pore size distribution is shown in FIG. 3.

TABLE 1

Surface Area and Mechanical Strength of Untreated Alumina Extrudates

| Sample of | Surface Area ($m^2/g$) | Side Crushing Strength (Newton/mm) |
|---|---|---|
| Example 1 | 226 | 9.6 |
| Example 2* | 235 | 17.2 |

*Average of several preparations.

TABLE 2

Surface Area and Mechanical Strength of Thermally Treated Extrudates

| Sample of | Surface Area ($m^2/g$) | Side Crushing Strength (Newton/mm) |
|---|---|---|
| Example 3 | 214.8 | 11.5 |
| Example 4 | 143.0 | 14.0 |
| Example 5 | 88.5 | 4.7 |
| Example 6 | 59.0 | 4.4 |
| Example 7 | 23.3 | 5.3 |
| Example 8 | 117.0 | 9.7 |
| Example 9 | 150.0 | 8.4 |

EXAMPLE 9

Alumina extrudates, prepared in accordance with Example 2, treated with acetic acid such that the weight ratio of acetic acid to alumina is 1:1 for 1 hour at 300° C. The extrudates were then calcined at 550° C. The properties of the resulting product are listed in Table 2 and the pore size distribution is shown in FIG. 3.

EXAMPLE 10

To 41 g of alumina extrudates prepared in accordance with Example 2, 26 ml of ammonium heptamolybdate solution (pH 5.3) was added. The concentration of the ammonium heptamolybdate solution was adjusted such that the desired level of molybdenum loading on the catalyst is achieved by a single complete pore-filling impregnation. The sample was dried in an oven at 110° C. and calcined at 500° C. The calcined molybdena containing extrudates were subsequently impregnated with 26 ml of nickel nitrate solution (pH 4.3). The catalyst was then dried in the oven at 110° C. for 3 hours. The final catalyst contained 4.5% NiO and 13.5% $MoO_3$.

EXAMPLE 11

A catalyst is prepared as in Example 10 except alumina extrudates of Example 8 were used instead of alumina of Example 2.

EXAMPLE 12

Figure 4:
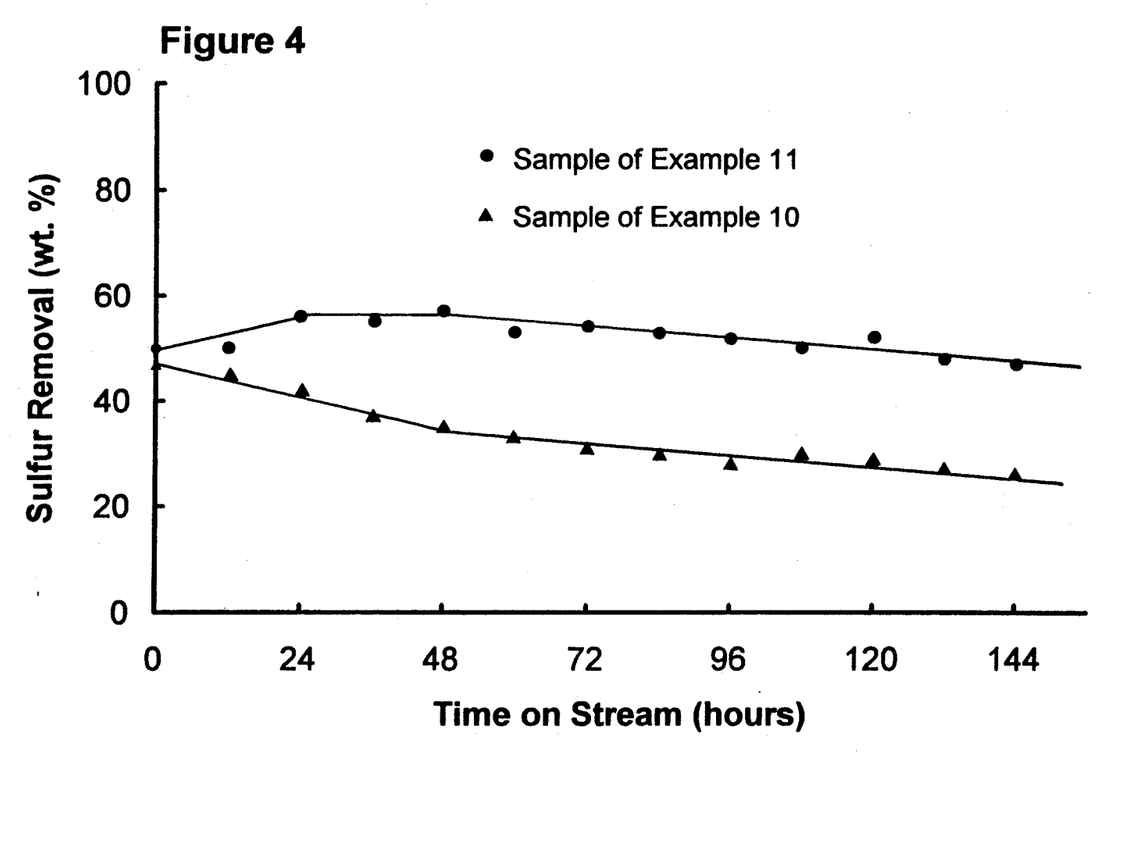
FIG. 4 shows a comparison of Hydrodesulfurization activities of catalyst samples prepared in accordance with examples 10 and 11.

Catalysts prepared in accordance with Examples 10 and 11 were used as hydrotreating catalysts for vacuum residues. Properties of the feedstock are summarized in Table 3. The desulfurization activities of both catalysts are presented in FIG. 4, showing clearly the advantages of the present invention in maintaining high activity for large average pore diameter alumina extrudates.

TABLE 3

Physico-Chemical Properties of Feedstock

| Property | Feedstock |
|---|---|
| Density @15 C, g/ml | 0.9955 |
| API Gravity | 10.6 |
| Total Sulfur, wt. % | 5.2 |
| Total Nitrogen, wt. % | 0.41 |
| C.C.R., wt. % | 16.9 |
| Kin-Viscosity, cSt @100° C. | 840 |
| Ash Content, wt. % | 0.02 |
| Metal in Ash, ppm | |
| Ni | 36.2 |
| V | 78.9 |
| Asphaltenes, wt. % | 8.4 |

EXAMPLE 13

Alumina extrudates were prepared in accordance with the procedure described in Example 1, except that 5 parts of a lignosulfonate resin were added to the paste exactly after 20 minutes from the start of the mixing, when the acid addition was completed. Kneading was continued for another 10 minutes after adding the lignosulfonate resin and the paste were extruded. The characteristics of the extrudates prepared by the procedure are summarized in Table 4.

EXAMPLE 14

Alumina extrudates were prepared in accordance with the procedure described in Example 1, except that 5 parts of a sulfonated melamine formaldehyde resin prepared in accordance with U.S. Pat. No. 4,677,159 was added to the paste exactly after 20 minutes from the start of the mixing, when the acid addition was completed. Kneading was continued for another 10 minutes after adding the sulfonated melamine formaldehyde resin. The characteristics of the extrudates prepared by the procedure are summarized in Table 4.

EXAMPLE 15

Alumina extrudates were prepared in accordance with the procedure in Example 1, except that 5 parts of a sulfonated aminoformaldehyde resin prepared in accordance with U.S. Pat. No. 4,663,387 was added to the paste exactly after 20 minutes from the start of the mixing, when the acid addition was completed. Kneading was continued for another 10 minutes after adding the sulfonated aminoformaldehyde resin and the paste was extruded. The characteristics of the extrudates prepared by the procedure are summarized in Table 4.

EXAMPLE 16

Alumina extrudates were prepared in accordance with the procedure described in Example 1, except that 5 parts of a sulfonated naphthalene formaldehyde resin was added to the paste exactly after 20 minutes from the start of the mixing, when the acid addition was completed. Kneading was continued for another 10 minutes after adding the sulfonated naphthalene formaldehyde resin and the paste was extruded. The characteristics of the extrudates prepared by the procedure are summarized in Table 4.

EXAMPLE 17

Alumina extrudates were prepared in accordance with the procedure described in Example 1, except that 12.5 parts of a sulfonated melamine formaldehyde resin prepared in accordance with U.S. Pat. No. 4,677,159 was added to the paste exactly after 20 minutes from the start of the mixing, when the acid addition was completed. Kneading was continued for another 10 minutes after adding the sulfonated melamine formaldehyde resin and the paste was extruded. The characteristics of the extrudates prepared by the procedure are summarized in Table 4.

EXAMPLE 18

Alumina extrudates were prepared in accordance with the procedure described in Example 1, except that 12.5 parts of a sulfonated aminoformaldehyde resin prepared in accordance with U.S. Pat. No. 4,663,387 was added to the paste exactly after 20 minutes from the start of the mixing, when the acid addition was completed. Kneading was continued for another 10 minutes after adding the sulfonated aminoformaldehyde resin and the paste was extruded. The characteristics of the extrudates prepared by the procedure are summarized in Table 4.

EXAMPLE 19

Alumina extrudates were prepared in accordance with the procedure described in Example 1, except that 12.5 parts of a lignosulfonate resin were added to the paste exactly after 20 minutes from the start of the mixing, when the acid addition was completed. Kneading was continued for another 10 minutes after adding the lignosulfonate resin and the paste was extruded. The characteristics of the extrudates prepared by the procedure are summarized in Table 4.

EXAMPLE 20

Alumina extrudates were prepared in accordance with the procedure described in Example 1, except the 12.5 parts of a sulfonated naphthalene formaldehyde resin were added to the paste exactly after 20 minutes from the start of the mixing, when the acid addition was completed. Kneading was continued for another 10 minutes after adding the sulfonated naphthalene formaldehyde resin and the paste was extruded. The characteristics of the extrudates prepared by the procedure are summarized in Table 4.

EXAMPLE 21

Alumina extrudates were prepared in accordance with the procedure described in Example 1, except that 25 parts of a sulfonated melamine formaldehyde resin prepared in accordance with U.S. Pat. No. 4,677,159 were added to the paste exactly after 20 minutes from the start of the mixing, when the acid addition was completed. Kneading was continued for another 10 minutes after adding the sulfonated melamine formaldehyde resin and the paste was extruded. The characteristics of the extrudates prepared by the procedure are summarized in Table 4.

EXAMPLE 22

Alumina extrudates were prepared in accordance with the procedure described in Example 1, except that 25 parts of a sulfonated aminoformaldehyde resin prepared in accordance with U.S. Pat. No. 4,663,387 were added to the paste exactly after 20 minutes from the start of the mixing, when the acid addition was completed. Kneading was continued for another 10 minutes after adding the sulfonated aminoformaldehyde resin and the paste was extruded. The characteristics of the extrudates prepared by the procedure are summarized in Table 4.

EXAMPLE 23

Alumina extrudates were prepared in accordance with the procedure described in Example 1, except that 25 parts of a lignosulfonate resin were added to the paste exactly after 20 minutes from the start of the mixing, when the acid addition was completed. Kneading was continued for another 10 minutes after adding the lignosulfonate resin and the paste was extruded. The characteristics of the extrudates prepared by the procedure are summarized in Table 4.

TABLE 4

| Sample of | Surface Area and Mechanical Strength of Extrudates Prepared Using Different Sulfonated Resins at Different Concentrations | |
|---|---|---|
| | Surface Area ($m^2/g$) | Side Crushing Strength (N/mm) |
| Example 13 | 255 | 14.8 |
| Example 14 | 246 | 13.9 |
| Example 15 | 258 | 13.9 |
| Example 16 | 248 | 17.0 |
| Example 17 | 260 | 13.2 |
| Example 18 | 264 | 14.2 |
| Example 19 | 254 | 14.5 |
| Example 20 | 254 | 17.0 |
| Example 21 | 272 | 16.8 |
| Example 22 | 283 | 16.1 |
| Example 23 | 282 | 16.8 |

The role of the sulfonated polymer used in the aforementioned compositions and processes is not for pore generation. It is believed that the sulfonated polymers provide a lubricating action between the alumina particles so that those particles become more closely compacted and thus provide substrates with higher mechanical strength. It is also believed that the generation of the pores in the presently disclosed processes is attributed to the thermal treatment of the substrates after the powder is shaped into a tablet or extrudate.

What is claimed:

1. A process for making alumina substrates having a pore structure with an average pore diameter ranging from 50 to 1000 angstrom units with a narrow pore size distribution, and relatively high strength comprising:
   a) providing a mixture of alumina powder, water and peptizing agent and forming a paste like mass from the mixture;
   b) kneading the paste like mass to obtain a wet free flowing paste;
   c) providing and adding a sulfonated resin solution to the free flowing paste obtained in step b) and continuing to knead the free flowing paste;
   d) forming a shaped body from the free flowing paste;
   e) drying the shaped body;
   f) calcining the dried shaped body; and
   g) thermally treating the calcined body and recalcine it.

2. A process for making alumina substrates having a pore structure with an average pore diameter ranging from 50 to 1000 angstrom units with a narrow pore size distribution, and relatively high strength according to claim 1 wherein step d) is carried out by extruding the free flowing paste through a suitable die.

3. A process for making alumina substrates having a pore structure with an average pore diameter ranging from 50 to 1000 angstrom units with a narrow pore size distribution, and relatively high strength according to claim 1 wherein step g) includes the step of providing an autoclave and heating the calcined body therein at a temperature in the range of 100°–400° C. and for a period of at least 30 minutes.

4. A process for making alumina substrates having a pore structure with an average pore diameter ranging from 50 to 1000 angstrom units with a narrow pore size distribution, and relatively high strength according to claim 3 wherein the thermal treatment in the autoclave is carried out in the presence of a reagent selected from the group consisting of water, ammonium hydroxide and low molecular weight organic acid.

5. A process for making alumina substrates having a pore structure with an average pore diameter ranging from 50 to 1000 angstrom units with a narrow pore size distribution, and relatively high strength according to claim 2 wherein the mixture in step a) includes an acid solution having an acid concentration from about 0.5 to 10% by weight and wherein the amount of acid solution added to 1000 parts of alumina range between 100 to 1000 parts.

6. A process for making alumina substrates having a pore structure with an average pore diameter ranging from 50 to 1000 angstrom units with a narrow pore size distribution, and relatively high strength according to claim 5 wherein the sulfonated resin solution in step c) is added over a period of at least about 15 minutes with continuous kneading.

7. A process for making alumina substrates having a pore structure with an average pore diameter ranging from 50 to 1000 angstrom units with a narrow pore size distribution, and relatively high strength according to claim 6 wherein the kneading in step c) is continued after the addition of the sulfonated resin solution for a period of at least about 10 minutes.

8. A process for making alumina substrates having a pore structure with an average pore diameter ranging from 50 to 1000 angstrom units with a narrow pore size distribution, and relatively high strength according to claim 7 wherein carbon black or binders are added in step c).

9. A process for making catalysts having a pore structure with an average pore diameter ranging from 50 to 1000 angstrom units with a narrow pore size distribution, and relatively high strength comprising:
   a) providing a mixture of alumina powder, water and peptizing agent and forming a paste like mass from the mixture;
   b) kneading the paste like mass to obtain a wet free flowing paste;
   c) providing and adding a sulfonated resin solution to the free flowing paste obtained in step b) and continuing to knead the free flowing paste;
   d) forming a shaped body from the free flowing paste;
   e) drying the shaped body;
   f) calcining the dried shaped body;
   g) thermally treating the calcined body and recalcine it; and
   h) impregnating the thermally treated shaped body with a solution of a metallic salt and drying and calcining to obtain a catalyst.

10. A process for making catalysts having a pore structure with an average pore diameter ranging from 50 to 1000 angstrom units with a narrow pore size distribution, and relatively high strength according to claim 9 wherein the shaped body is impregnated by a water soluble metallic salt, dried at 80°–150° C. for 20 to 30 hours and calcined at 450° to 600° C. for 4 to 8 hours.

11. A process for making catalysts having a pore structure with an average pore diameter ranging from 50 to 1000 angstrom units with a narrow pore size distribution, and relatively high strength according to claim 9 wherein the dried shaped body from step f) is thermally treated in an autoclave at temperatures ranging between 100°–400° C. with a reagent selected from pure water, ammonium hydroxide and acetic acid.

12. A raw batch mix for use in making alumina substrates having a pore structure with an average pore diameter ranging from 50 to 1000 angstrom units with a narrow pore size distribution, and relatively high strength comprising a wet free flowing mass of alumina powder, water and a peptizing agent, and having a sulfonated resin solution dispersed therein in an amount of 10 to 150 parts of resin per 1000 parts of alumina.

13. A raw batch mix according to claim 12 in which the alumina paste is prepared from hydrated or calcined alumina and in which the peptizing agent is an organic or inorganic acid.

14. A raw batch mix according to claim 13 in which the acid is selected from the group consisting of nitric acid and acetic acid and wherein the concentration of the acid solution range between 0.5 and 10% by weight and wherein the amount of acid solution added to 1000 parts of alumina range between 100–1000 parts.

15. A raw batch mix according to claim 14 in which the sulfonated resin is selected from the group consisting of sulfonated melamine formaldehyde, sulfonated urea melamine formaldehyde, sulfonated naphthalene formaldehyde and lignosulfonate resins.

16. A raw batch mix according to claim 15 in which the the resin solution is in the range of 2–30% by weight.

17. An alumina substrate having narrow monomodal pore structure made in accordance with the process defined by claim 1.

18. An alumina substrate having narrow monomodal pore structure made in accordance with the process defined by claim 8.

19. A catalyst having a narrow monomodal pore structure made in accordance with the process defined by claim 11.

20. An alumina substrate having narrow bimodal pore structure made in accordance with the process defined by claim 1.

* * * * *